3,308,166
PREPARATION OF ORGANIC POLYSULPHIDES
Michel Biensan and Pierre Bapserès, Pau, France, assignors to Societe Nationale des Petroles d'Aquitaine, Paris, France
No Drawing. Filed May 18, 1964, Ser. No. 368,403
Claims priority, application France, May 20, 1963, 935,385
5 Claims. (Cl. 260—608)

The present invention relates to the preparation of organic polysulphides; it is directed more particularly to the production of dialkyl polysulphides which may contain in their molecule various numbers of atoms of sulphur.

The organic polysulphides and more particularly those of dialkyls are products of great industrial interest. They may be obtained, as is known, by the action of sulphur on mercaptans or on polysulphides, that is to say, sulphides containing more than 1 atom of sulphur in the molecule; it is known that this reaction can be carried out in the presence of catalysts, such as amines. However, this method of manufacture produces principally disulphides having only small quantities of tri-and of tetrasulphides. Supplementary atoms of sulphur may be introduced in the molecule of disulphide using amines as catalyst, but then a considerable excess of sulphur must be used, with heating, during a prolonged time.

Another known method consists in using basic metallic catalysts, such as sodium sulphide, sodium hydroxide, lime, barium hydroxide, etc. as shown in United States Patent 3,038,013 and eventually using an aliphatic alcohol as promoter (United States Patent 3,022,351). This results in obtaining polysulphides which are richer in sulphur, but the resulting products are more or less colored; the yield of the operation is low, especially when the mercaptans used inhibit a good yield; thus, with the tertiododecyl mercaptan, this yield is only of the order of 60% and it falls to 40% for the tertio-hexadecyl mercaptan.

The present invention, by contrast, permits the obtaining of polysulphide of the desired composition and at the same time providing good physical-chemical qualities with excellent yields. More particularly, the new process, according to the invention, permits obtaining dialkyls of di-, tri-, tetra-, penta-, hexasulphides, etc., and eventually diaryl- or dicyclo alkyle-polysulphides. The invention allows one to obtain noncoloured polysulphides which may be used as such, without special purification steps, for their conventional uses.

The new process according to the invention consists in causing free sulphur to react on one or several mercaptans, in the presence of at least one amine used as a catalyst and at least one alcohol used as a promoter.

This invention has the surprising result that the amines, indicated in the prior art as giving more or less imperfect results, indicated above, produce remarkable results when they are used jointly with the promoters consisting of alcohols. While alcohols have been previously proposed as promoters in this type of reaction, there was never the idea of combining them with amines, and there was no reason for expecting better results from such a combination. This combination, which surprisingly produces a new and important improvement, is the subject of the present invention.

The process of the invention may be applied to different aliphatic or aromatic mercaptans; it permits the preparation of polysulphides having great industrial value, starting with aliphatic mercaptans having linear or branded chains and containing in their molecule a number of carbon atoms which may vary for instance from 1 to 30 and more specifically 1 to 18; very desirable products are obtained from methyl-, ethyl-, n-propyl-, isopropyl-, n-butyl-, t-butyl-, hexyl-, octyl-, nonyl-, t-nonyl-, decyl-, dodecyl-, t-dodecyl-, tetradecyl-, hexadecyl-, octadecyl-, n-eicosyl-, triacontyl-, mercaptans and others.

The reaction which takes place in the process in accordance with the invention may be written in a general way as follows:

$$2RSH + nS \longrightarrow R_2S_{n+1} + H_2S$$

where R is the organic radical of the mercaptan used.

Acccording to the invention the desired content of sulphur, in the polysulphide to be prepared, may be obtained by choosing an adequate quantity of sulphur to be reacted with the mercaptan used.

The reaction in accordance with the invention may be carried out at ordinary temperature, i.e., about 10° to 30° C. or above; the temperature may go eventually up to the boiling point of the alcohol used as promoter, but preferably it does not exceed 150° C.; it depends, moreover, on the boiling points and the thermal stability of the reactants present. Excellent results are generally obtained at temperatures in the range between the ambient and 100° C.

The amines acting as catalyst may belong to various classes, such as aliphatic, aromatic, cycloaliphatic, eventually having substitutions of one or several alcanol groups, etc. However aliphatic amines, and particularly those which have 2 to 6 carbon atoms, are preferred. Certain nitrogenous compounds known as vulcanization accelerators are equally suitable.

As regards the aliphatic amines, their activity as catalysts generally diminishes with the length of the chain, as well as with the degree of branching thereof. Aromatic amines are generally less active than the aliphatic ones, but their activity increases when the contain aliphatic radicals. According to a particular feature of the invention, alcanol amines, more particularly, the mono-, di-, or tri-ethanolamines are advantageously used.

Other suitable amines are: primary, secondary and tertiary methyl-, ethyl-, propyl-, isopropyl-, butyl-, isobutyl-, valeryl-, and hexyl-amines, though their catalytic activity decreases as the number of carbon atoms increases; for each amine the activity is maximal when the aliphatic chain is straight and non branched. Cycloaliphatic amines, such as cyclopentylamine, methylcyclopentylamine, cyclohexylamine or methylcyclohexylamine, while suitable to the process of the invention, have somewhat less activity than the above mentioned aliphatic amines. One can also use cyclic bases, for example pyridine, aniline, methyl-phenyl-amine, ethyl-aniline and so on in spite of their weaker catalytic effect.

The proportion of amines used as catalyst is of the order of 0.01 to 5%, and sometimes even more, per weight of the mercaptan used, while the preferred proportion is from 0.05 to 2%.

The alcohols which act as promoters are preferably aliphatic alcohols with a low or high number of carbon atoms, moreover, alcohols containing 1 to 30 atoms of carbon, and especially 1 to 18, in their molecule, may be advantageously used. The common lower alcohols, such as methanol, ethanol, propanol, butanol, isobutanol, etc., are particularly suitable in many cases. However other alcohols may be successfully used, such as for example hexanols, heptanols, octanols, decanols, undecanols, dodecanols, hexadecanols and so on.

According to a preferred form of the invention, the alcohol and the amine are chosen in such a way as to permit dissolving the latter in the alcohol, while the alcohol is insoluble in the polysulphide to be prepared. This permits the separation of the formed product and the promoter by simple decantation. These conditions are generally more easily attained by using alcohols of low molecular weight, particularly those which have 1 to 4 carbon atoms in their molecule.

The quantity of promoter to be added to the reacting medium may vary between large limits, for example between 0.5 and 10% by weight in relation to the mercaptan used. This quantity should be sufficient to permit the reflux of the alcohol in the course of the heating of the reaction mixture at a given moment of the operation; for this purpose it is preferable to use about 1 to 5% alcohol.

The polysulphide having been synthesized in the course of the reaction, under the conditions set out above, it must be separated from the reaction medium. This separation comprises generally distillation with a view of eliminating the alcohol and the amine. When the alcohol is not soluble in the formed polysulphide, it is separated by decantation; the remaining amine and the last traces of this alcohol being then eliminated by distillation and/or by entrainment with steam or by means of an inert gas.

In the inventive process, it is preferable to use at least 1 atom gram of sulphur per mole of mercaptan to assure that the nontransformed mercaptan does not remain in the reaction medium.

The transformation of the used mercaptan into the desired polysulphide being thus more effective, there is generally no need of eliminating the excess of mercaptan at the end of the operation; it should be understood that this elimination may be accomplished, if there be reason, by distillation and/or by entrainment. On the other hand, it is preferable to purify the resulting product and to dehydrate it, this being accomplished in any known manner, more particularly by treating with an absorbent material, such as, for example, activated carbon and by a dehydrating agent such as anhydrous sodium sulphate, or by any other means of dehydration.

The invention is illustrated by the following non limiting examples.

*Example 1*

The following materials were placed in a reactor having several tubulures and provided with a stirring and cooling system:

|  | G. |
|---|---|
| 16 atoms of sulphur | 512 |
| 8 moles of 94.5% purity terdodecyl mercaptan (main impurity being tetrapropylene) | 1712 |
| 0.18 moles of triethylamine | 22 |
| 3.44 moles methanol | 110 |
| Total | 2356 |

The proportion of amine in relation to the mercaptan+ sulphur was 1% by weight and that of methanol 5%.

As soon as the mixture of methanol and triethylamine was added, the reaction started at the ambient (22° C.) temperature releasing a considerable quantity of $H_2S$. In about 30 minutes 100 g. $H_2S$ were thus obtained and the operation was slowed down; then the mixture was heated with the reflux of methanol, the material being then at about 70° C., which was maintained until the termination of the reaction and the release of $H_2S$; this took about 30 minutes.

The cooler was then replaced by a distillation column and the assembly was heated to 100° C. in such manner as to distill the methanol and a small quantity of the triethylamine.

The product was then heated to 110–115° C. and subjected to an entrainment by steam in order to free all traces of triethylamine.

During this reaction, the major portion of the tetrapropylene contained in the separated mercaptan was stripped. The mercaptan was decanted and may be recovered. The purification was finished by washing with a current of nitrogen, this representing a gas having no reactive effect on the product, in order to eliminate the small amount of water which remained in the reaction medium.

The balance sheet of the different operations is as follows:

|  | Total | $H_2S$ | $Et_3N$ | $CH_3OH$ |
|---|---|---|---|---|
| Gas release | 152.3 | 131.5 | [1] 12 | [1] 8.8 |
| Distribution of methanol | 85.7 | 0.197 | 3.5 | [1] 82 |
| Entrainment with steam: |  |  |  |  |
| Water phase | 2,276 | 0.55 | 6.5 | [1] 19.2 |
| Organic phase | 13.8 |  |  |  |
| Polysulphide obtained | 2,011 | Traces | 0 | 0 |

[1] Figures calculated by the difference.

The conversion of mercaptan into polysulphide is quantitative.

The polysulphide obtained had a very small excess of $H_2S$ and was slightly murky. In order to purify it, it was treated at 80° C. for 1 to 3 hours with 0.5% bone black (animal black and 0.1% $SO_4Na_2$. The product was then filtered at 80° C. to diminish viscosity and to accelerate the rate of filtration.

The polysulphide thus obtained was a transparent liquid, very viscous and of a slightly yellow color. It was entirely free of $H_2S$ and of mercaptan.

In the process, the sodium sulphate served as absorbent for water, while the bone black eliminated dissolved $H_2S$. The simultaneous use of these two products provided, in one single operation, a product free of $H_2S$ and one which was entirely transparent. The amounts used depend essentially on the quantities of impurities of the treated product.

It should be taken into consideration during the course of these different operations, that the preparation of the polysulphide itself takes place during the first stage, that is to say, during heating of the reaction medium with methanol under reflux; the subsequent operations, that is to say, entrainment with steam and with nitrogen, treatment with the bone black and with sodium sulphate, and filtration, serve to purify the product prepared in the first stage.

Characteristics of the product obtained:
Index refraction at 20° C. $n_D^{20}=1.5473$
Density at 20° C. $d_4^{20}=1.0131$
Total sulphur:
  Found _____ 31.8%
  Theoretical for $(C_{12}H_{25})_2S_5$ _____ 32.1%
Doctor test _____ negative
Molecular mass:
  Found _____ 470
  Theoretical for $(C_{12}H_{25})_2S_5$ _____ 498
Temperature at the beginning of decomposition _____ 185° C.

*Example 2*

A reaction was set up of: 146 g. octylmercaptan (1 mole); 64 g. sulphur (2 atoms); 0.9 g. triethylamine, 5 g. methanol. Under the same conditions as in Example 1, after a reaction time of 30 minutes without heating, the product was heated 30 minutes at 70° C. The expected quantity of $H_2S$ was collected. The product thus obtained was then cooled and decanted in order to separate the polysulphide from the methanol. A current of nitrogen was then passed through the polysulphide at 100° C., in a column provided with Raschig rings; the product thus obtained contained $H_2S$; it was then treated with bone black and with sodium sulphate, as indicated in Example 1.

The determination of molecular mass on the product led to a figure of 360, whereas the theoretical molecular mass of dioctyl pentasulphide is 386.

Example 3

In the preparation according to Example 2, when using 80 g. of sulphur (2.5 atoms) instead of 64, a polysulphide was obtained the average composition of which approximated $(C_8H_{17})_2S_6$.

Example 4

In Example 1 the triethylamine was replaced by n-butylamine and the reaction was started at 55° C.; the same results as in Example 1 were obtained but there was a little amount of untransformed mercaptan in the product of the reaction.

Example 5

The same results as in Example 1 were obtained when ethanol was used instead of methanol and 2% of di-n.propylamine in the place of triethylamine.

Example 6

The following materials were reacted at 45° C.; 517 g. t-hexadecylmercaptan (2 moles); 100 g. sulphur (3.12 atoms); 8 g. diethanolamine, and 30 g. isobutanol. After one and a half hours the temperature of the mixture was raised up to 108° and isobutanol was allowed to reflux during ½ hour at its boiling point; then the operation was continued as in Example 1. The polysulphide thus obtained showed an average composition close to $(C_{16}H_{33})_2S_4$ and was formed with a yield of about 80% with respect to the mercaptan used.

Example 7

The procedure of Example 1 was applied to 8 moles of t-butylmercaptan (720 g.), with n-propanol instead of methanol; a polysulphide was obtained which had 57% sulphur by weight and a molecular weight of 267. That indicated that the product would be a mixture of about 80% t-dibutylpentasulphide with 20% t-dibutyltetrasulphide. It resulted from the conversion of 98.5% of the t-butylmercaptan used.

Example 8

In Example 3 methanol was replaced by 7 g. of n-dodecanol and the same results were obtained with a slightly decreased yield (about 95%).

What is claimed is:

1. A process for producing organic polysulphides, which consists in making react a mercaptan with sulphur at a temperature comprised between the ambient temperature and 150° C., a catalytic amount of an amine and a promoter constituted by an aliphatic alcohol being admixed with the mercaptan and the sulphur.

2. A process for producing dialkylpolysulphides, which consists in: mixing an alkylmercaptan with sulphur; adding to the mixture a catalytic amount of an amine and at least 0.5% by weight of an aliphatic alcohol as promoter; keeping the mixture at a temperature of 10° C. to 150° C. until hydrogen sulphide has ceased to release; and separating the amine and the alcohol from the product thus obtained.

3. A process for producing dialkylpolysulphides, which consists in: mixing one mole of alkylmercaptan having 1 to 30 carbon atoms in its molecule with sulphur, 0.01 to 5% by weight, in relation to the mercaptan, of an aliphatic amine selected from the group consisting of monoalkyl, dialkyl and trialkyl amines in which the alkyl is one of the radicals methyl, ethyl, propyl, isopropyl, butyl, isobutyl, pentyl and hexyl, and 0.5 to 10% by weight with relation to the mercaptan of an aliphatic alcohol having 1 to 30 carbon atoms in its molecule; keeping the mixture at a temperature of 10° to 150° C. until the release of hydrogen sulphide has substantially ceased; and eliminating the amine and the alcohol as well as the unreacted fraction of the mercaptan from the product thus obtained.

4. A process for producing dialkylpolysulphides, which consists in: mixing one mole of alkylmercaptan having 1 to 18 carbon atoms in its molecule with sulphur, 0.01 to 5% by weight, in relation to the mercaptan, of an aliphatic amine having 2 to 6 carbon atoms in its molecule, and 0.5 to 10% by weight with relation to the mercaptan of an aliphatic alcohol having 1 to 16 carbon atoms in its molecule; keeping the mixture at a temperature of 10° to 100° C. until the release of hydrogen sulphide has substantially ceased; and eliminating the amine and the alcohol as well as the unreacted fraction of the mercaptan from the product thus obtained.

5. A process for producing dialkylpolysulphides, which consists in: mixing one mole of alkylmercaptan having 1 to 18 carbon atoms in its molecule with sulphur, 0.01 to 5% by weight, in relation to the mercaptan, of an aliphatic amine having 2 to 6 carbon atoms in its molecule, and 0.5 to 10% by weight with relation to the mercaptan of an aliphatic alcohol having 1 to 16 carbon atoms in its molecule: the alcohol being miscible with the amine but substantially non-miscible with the polysulphide to be prepared; keeping the mixture at a temperature of 10° to 100° C. until the release of hydrogen sulphide has substantially ceased; decanting the alcohol from the mixture and washing the product obtained after the decantation of the alcohol.

No references cited.

CHARLES B. PARKER, *Primary Examiner.*

DELBERT R. PHILLIPS, *Assistant Examiner.*